US012555945B2

(12) United States Patent
Onodera et al.

(10) Patent No.: US 12,555,945 B2
(45) Date of Patent: Feb. 17, 2026

(54) CONNECTOR DEVICE FOR AN ELECTRIC MACHINE TOOL

(71) Applicant: EXEN Corporation, Tokyo (JP)

(72) Inventors: Mitsuo Onodera, Tokyo (JP); Teppei Hayashi, Tokyo (JP); Yoshio Saito, Tokyo (JP); Yuta Mori, Tokyo (JP)

(73) Assignee: EXEN Corporation, Tokyo (JP)

( * ) Notice: Subject to any disclaimer, the term of this patent is extended or adjusted under 35 U.S.C. 154(b) by 285 days.

(21) Appl. No.: 18/548,345

(22) PCT Filed: Aug. 25, 2022

(86) PCT No.: PCT/JP2022/032084
§ 371 (c)(1),
(2) Date: Aug. 30, 2023

(87) PCT Pub. No.: WO2023/037891
PCT Pub. Date: Mar. 16, 2023

(65) Prior Publication Data

US 2024/0154341 A1 May 9, 2024

(30) Foreign Application Priority Data

Sep. 7, 2021 (JP) ................................ 2021-145238

(51) Int. Cl.
*H01R 13/42* (2006.01)
*H01R 13/533* (2006.01)
*H01R 13/631* (2006.01)

(52) U.S. Cl.
CPC .......... *H01R 13/42* (2013.01); *H01R 13/533* (2013.01); *H01R 13/631* (2013.01)

(58) Field of Classification Search
CPC .. H01R 12/707; H01R 13/08; H01R 13/2471; H01R 13/405; H01R 13/502; H01R 12/58; H01R 4/2406; H01R 12/75; H01R 12/718
See application file for complete search history.

(56) References Cited

U.S. PATENT DOCUMENTS

2024/0154341 A1* 5/2024 Onodera .............. H01R 13/631

FOREIGN PATENT DOCUMENTS

JP H03-048864 Y2 10/1991
JP 2009-4111 A 1/2009

(Continued)

OTHER PUBLICATIONS

The International Search Report ("ISR") of PCT/JP2022/032084 mailed on Oct. 18, 2022.

*Primary Examiner* — Abdullah A Riyami
*Assistant Examiner* — Nader J Alhawamdeh
(74) *Attorney, Agent, or Firm* — METROLEX IP LAW GROUP, PLLC; Robert L. Scott, Esq.

(57) ABSTRACT

A connector device according to one or more embodiments includes a male connector including multiple male contact pieces, and a male contact piece retention portion, and a female connector including multiple female contact pieces, and a female contact piece retention portion. The male contact piece retention portion has multiple concentrically formed convex portions. The multiple male contact pieces are mounted on an outer circumferential wall of the convex portions, and arranged concentrically, with a tip end thereof being inclined toward the center of the convex portions. The female contact piece retention portion has concentrically formed multiple concave portions. The multiple female contact pieces are mounted on an inner circumferential wall of the concave portions, and arranged concentrically, with a base end thereof being inclined toward the center of the (Continued)

(LONGITUDINAL SECTION)

(CONNECTING SIDE)

concave portions. The convex portion and the concave portion are brought into contact and tightly fitted with one another.

6 Claims, 7 Drawing Sheets

(56) References Cited

FOREIGN PATENT DOCUMENTS

| | | | | |
|---|---|---|---|---|
| JP | 2012-164474 | A | | 8/2012 |
| JP | 2015018731 | A | * | 1/2015 |
| JP | 2021-77477 | A | | 5/2021 |

* cited by examiner (LONGITUDINAL SECTION) (CONNECTING SIDE)

(CONNECTING SIDE) (LONGITUDINAL SECTION)

(CONNECTING SIDE)

(LONGITUDINAL SECTION)

CONNECTOR DEVICE FOR AN ELECTRIC MACHINE TOOL

The present disclosure relates to a connector device used for an internal wiring connection of an electric machine tool that causes vibration.

BACKGROUND ART

Technical Field

The present invention relates to a connector device used for an internal wiring connection of an electric machine tool that causes vibration.

Background Art

Electric machine tools that cause vibration, such as a concrete vibrator, achieve vibration resistance mostly by providing minimum wiring connections or by adopting a complicated structure, so as not to produce defects such as a contact failure or a breakage of internal wirings due to vibration. It has thus been unable to provide ease of maintenance when defects occur, for instance.

To improve maintainability, an invention of a concrete vibrator was proposed that uses a connector device for removably coupling internal wirings, which is described in Japanese publication of examined utility model number: JPY2 H03-048864.

The connector device described in the publication JPY2 H03-048864 has a structure for coupling a plurality of power receiving cords coming out at the rear of an electric motor stator mounted in a cylindrical housing to a power supply cord connected to an external power supply. In the structure, a male connector is configured such that a pin-shaped male terminal is connected at a tip of a power receiving cord, and the power receiving cord is secured and fitted to a cord guide made of an elastic material, thereby the male terminal is disposed in a predefined position. In the structure, a female connector is configured such that a pin-shaped female terminal is connected at a tip of a power supply cord, and the power supply cord is secured and fitted to a terminal stopper, thereby the female terminal is disposed in a predefined position in a cord cap made of an elastic material. The male connector and the female connector are then used to removably couple the male terminal and the female terminal.

In this connector device, when the male terminal of the male connector and the female terminal of the female connector are to be coupled, the male terminal of the male connector secured to the motor and the female terminal disposed in the cord cap are tightly fitted together to couple the male connector and the female connector, and then a hose joint is screwed in a cylindrical housing of the motor. The cord cap of the female connector, which is made of the elastic material, is thus pressed and elastically deformed in a circumferential direction and brought into close contact with an inner peripheral surface of the hose joint. This prevents the cord cap of the female connector from vibrating inside the hose joint.

The connector device, however, has a structure in which the male terminal and the female terminal are connected in a hollow portion inside the cord cap of the female connector. Connection portions themselves between the male and female terminals are thus vulnerable to the effects of vibration. Contact failures or short circuits may thus occur due to an inadvertent contact between connection portions. In particular, the cord cap of the female terminal is made of an elastic material, and thus the cord cap may be elastically deformed inward (into the hollow portion) too, due to a pressing force applied when the male and female connectors are connected. As a result, there is a high risk that two or more connection portions between the male and female terminals are urged toward the center, and brought into contact with one another.

When the male connector and the female connector are to be coupled, the cord cap made of an elastic material is elastically deformed in a circumferential direction due to a pressing force applied in a connection axis direction, and thus the cord cap is brought into tight contact with the inner peripheral surface of the hose joint. When the hose joint is to be mounted to or removed from the cylindrical housing by screwing it, there is a possibility that the cord cap is also rotated together with the hose joint, due to the friction between a hose joint inner peripheral surface and a cord cap outer peripheral surface. The connection portion can thus be damaged due to a load in a rotational direction applied to the connection portion between the male and female terminals.

Another issue may be that this connection structure is complicated and thus time and efforts are consumed to disassemble and reassemble components, resulting in poor maintainability.

PRIOR ART DOCUMENT

Patent Document

Patent Document 1: Japanese publication of examined utility model number: JPY2 H03-048864

SUMMARY

A connector device for an electric machine tool according to one or more embodiments is disclosed, which may provide excellent in vibration resistance and safety, and may be easily disassembled and reassembled.

A connector device for an electric machine tool according one or more embodiments is a connector device for removably connecting an internal wiring of the electric machine tool, comprising: a male connector comprising a plurality of male contact pieces, and a male contact piece retention portion for retaining the plurality of male contact pieces; and a female connector comprising a plurality of female contact pieces, and a female contact piece retention portion for retaining the plurality of female contact pieces. In one or more embodiments, the male contact piece retention portion has a plurality of convex portions arranged concentrically. The plurality of male contact pieces are concentrically mounted on an outer peripheral wall of the convex portion, and a tip end thereof being inclined toward the center of the convex portion. In one or more embodiments, a female contact piece retention portion has a plurality of concave portions arranged concentrically. The plurality of female contact pieces are concentrically mounted on an inner peripheral wall of the concave portion, and a base end thereof being inclined toward the center of the concave portion. With the above described configuration, the convex portion, to which the male contact piece is mounted, and the concave portion, to which the female contact piece is mounted, may be brought into contact and tightly fitted with one another.

The plurality of convex portions are configured such that a plurality of concentric convex portions are formed in the male contact piece retention portion. For instance, annular convex portions may be disposed concentrically about one cylindrical convex portion. Alternatively, concentric cylindrical convex portions, each having a different diameter, may be provided to form a step like structure.

The plurality of concave portions are configured such that a plurality of concentric concave portions, which may be fitted with the plurality of convex portions, may be formed in the female contact piece retention portion. For instance, annular concave portions may be disposed concentrically about one circular concave portion. Alternatively, concentrically arranged circular concave portions, each having a different diameter, may be provided to form a step like structure.

The expression of "the convex portion, to which the male contact piece is mounted, and the concave portion, to which the female contact piece is mounted, are brought into contact and tightly fitted with one another" means that the convex portion of the male contact piece retention portion, to which the male contact piece is mounted, and the concave portion of the female contact piece retention portion, to which the female contact piece is mounted, are fitted with one another.

In a connector device for an electric machine tool according to one or more embodiments, the convex portion of the male contact piece retention portion may have a convex stepped structure, and the concave portion of the female contact piece retention portion has a concave stepped structure.

In one or more embodiments, a contact length along a connection axis of a connection between the male and female contact pieces in a connection portion between the convex portion, to which the male contact piece is mounted, and the concave portion, to which the female contact piece is mounted, may be determined such that a contact length along the connection axis of the connection between the male and female contact pieces that are disposed in an inner portion is longer than a contact length along the connection axis of a connection between the male and female contact pieces that are disposed in an outer portion.

In one or more embodiments, either one of a male connector or a female connector is mounted to a first casing and the other one is mounted to a second casing, and then the male connector and the female connector are coupled by connecting the first casing and the second casing. In one or more embodiments, the male connector or the female connector mounted to at least one of the first casing or the second casing may be movable along the connection axis in the casing to which it is mounted, and an elastic member is disposed at the rear of the movable male connector or the female connector so that the male connector and the female connector are coupled, with the elastic member being urged when the first casing and the second casing are connected. A rubber, a spring, or the like may be used for the elastic member. The expression of "movable along the connection axis" may mean that it may be moved in a direction the male connector and the female connector are being connected, and the expression of "rear of the male connector or the female connector" may mean a side opposite to the side (a side to which respective contact piece is being mounted) the connector is connected with the other connector.

In one or more embodiments, either one of a male connector or a female connector is mounted to a first casing and the other one is mounted to a second casing, and then the male connector and the female connector are coupled by connecting the first casing and the second casing. In one or more embodiments, the male connector or the female connector mounted to the first casing and the female connector or the male connector mounted to the second casing may be both movable along the connection axis in the casing to which it is mounted, and an elastic member is disposed at each of the rear of the movable male connector and the female connector so that the male connector and the female connector are coupled, with the elastic member being urged when the first casing and the second casing are connected.

In the connector device for an electric machine tool according to one or more embodiments, a rotation prevention mechanism is provided that may prevent the male connector and/or the female connector mounted to be movable along the connection axis from rotating in the casing. The rotation prevention mechanism may be configured such that, for instance, but not limited to, by forming a ridge or a groove that extends along the connection axis on an outer peripheral surface of a male connector and/or a female connector which is movable along the connection axis, and then forming a groove or a ridge, which may be fitted to said ridge or groove, in a first casing to which the male connector or the female connector is mounted and/or to a second casing to which the female connector or the male connector is mounted. Alternatively, the rotation prevention mechanism may be configured by forming a protrusion or a hole axially extending at the rear of a male connector and/or a female connector which are movable along the connection axis, and then forming a hole or a protrusion, which may be fitted in said protrusion or hole, in a first casing to which the male connector or the female connector is mounted and/or to a second casing to which the female connector or the male connector is mounted. Alternatively, the rotation prevention mechanism may be configured such that a male connector or a female connector movable along the connection axis has a cross section being non-perfect circle, and an inner cavity of a first casing, to which the male connector or the female connector is mounted, and/or an inner cavity of a second casing, to which the female connector or the male connector is mounted, has a shape into which the male connector and/or the female connector having the non-perfect circle cross sectional shape may be slidably fitted. In short, it may be only required that the rotation prevention mechanism is configured to prevent a circumferential rotation of the connectors, without blocking the motion along the connection axis of the male connector or female connector mounted movably along the connection axis in the first casing and/or the female connector or male connector mounted movably along the connection axis in the second casing.

In the connector device for an electric machine tool according to one or more embodiments, either one of the male connector or the female connector may be secured to a first casing, while the other one is slidably fitted and inserted into a second casing, and a spacer made of an elastic member is disposed in the rear of the female connector or the male connector fitted and inserted into the second casing, so that the male connector and the female connector are brought into connection, with the spacer being urged, by connecting the first casing and the second casing.

In the connector device for an electric machine tool according to one or more embodiments, a rotation prevention mechanism is provided that may provide the female connector or the male connector slidably fitted and inserted into the second casing from rotating in the second casing. The rotation prevention mechanism may be configured, for instance, by forming a ridge or a groove that extends along the axis on an outer peripheral surface of a female connector or a male connector slidably fitted and inserted into a second casing, and then forming a groove or a ridge, which may be fitted into said ridge or groove, in the second casing. Alternatively, the female connector or the male connector slidably fitted and inserted into the second casing may be a non-perfect circle in cross section, and an inner cavity of the second casing, into which the female connector or the male connector is to be fitted, may have a shape into which the male connector and/or female connector having the non-perfect circle cross sectional shape may be slidably fitted.

According to one or more embodiments, a male connector comprises: a plurality of male contact pieces, and a male contact piece retention portion that retains the plurality of male contact pieces. The male contact piece retention portion has a plurality of convex portions arranged concentrically. The plurality of male contact pieces are concentrically mounted on an outer peripheral wall of the convex portion, and disposed with a tip end thereof being inclined toward the center of the convex portion. The female connector comprises: a plurality of female contact pieces, and a female contact piece retention portion that retains the plurality of female contact pieces. The female contact piece retention portion has a plurality of concave portions arranged concentrically. The plurality of female contact pieces are concentrically mounted on an inner peripheral wall of the concave portion, with a base end thereof being inclined toward the center of the concave portion such that the convex portion, to which the male contact piece is mounted, and the concave portion, to which the female contact piece is mounted, are brought into tight contact when the male connector and the female connector are connected. As a result, when the male contact piece and the female contact piece are connected, the male contact piece is retained by the male contact piece retention portion, and the female contact piece is retained by the female contact piece retention portion. Therefore, gaps may not readily form in a circumferential direction of the connection portion between the male contact piece and the female contact piece. Such a structure may reliably avoid contact failures in a connection portion between the male and female contact pieces due to the vibration. Such a configuration may also surely avoid short circuits which might be caused by a connection portion between the male and female contact pieces being inadvertently contacting another connection portion.

Since the male contact piece and the female contact piece are both arranged concentrically, load is less likely to be applied to the connection portion between the male and female contact pieces even when the contact pieces are rotated for connection and disconnection. Therefore, contact failures and damage due to the rotation of the contact pieces may be avoided. When the male connector and the female connector are to be connected or disconnected, a user may simply insert one of the male connector and the female connector to the other or pull one from the other linearly along the connection axis. Alternatively, the user may connect or disconnect them by rotating one or both of the male and female connectors. Since the tip end of the male contact piece is inclined toward the center of the convex portion and the base end of the female contact piece is inclined toward the center of the concave portion, the male and female contact pieces may be smoothly connected to and separated from one another, and the male contact piece and the female contact piece, which are being urged together along the connection axis, may be reliably brought into surface contact.

According to one or more embodiments, the convex portion of the male contact piece retention portion has a concave stepped structure, and the concave portion of the female contact piece retention portion has a concave stepped structure. Therefore, the strength in the connection portion between the male contact piece and the female contact piece may increased, and the vibration resistance may be further improved. In other words, the convex portion, to which the male contact piece is mounted, and the concave portion, to which the female contact piece is mounted, are coupled with their stepped portions being tightly fitted together. Therefore, a connection portion between one male contact piece and one female contact piece is axially offset with respect to another connection portion between another male contact piece and another female contact piece, in the connection axis direction. Such a structure enhances strength against a force applied in a direction to fold the connection portions. Since each of the connection portions between the male contact piece and the female contact piece is axially offset with respect to other connection portions, it may be possible to keep a distance between the connection portions, without increasing the outer diameter of the connectors. Such a structure may be advantageous to minimize the diameter of the connectors. It may also be possible to obtain a larger electrical contact surface area because the convex portion, to which the male contact piece is mounted, and the concave portion, to which the female contact piece is mounted, are coupled together, with their stepped portions being tightly fitted together.

According to one or more embodiments, the length along the connection axis of a connection surface between the male and female contact pieces is determined such that the length along the connection axis between the male and female contact pieces that are disposed in the inner portion is longer than the length along the connection axis of the connection between the male and female contact pieces that are disposed in the outer portion. Such a configuration may reduce differences between: the area of the contact surface between the male and female contact pieces that are disposed in the outer portion; and the area of the contact surface between the male and female contact piece disposed in the inner portion, which may reduce differences in contact resistance.

According to one or more embodiments, a connector device for an electric machine tool is provided, wherein either one of a male connector or a female connector is mounted to a first casing and the other one is mounted to a second casing, and then the male connector and the female connector are coupled by connecting the first casing and the second casing. The male connector or the female connector mounted to either one of the first casing or the second casing is movable along the connection axis in the casing to which it is mounted, and an elastic member is disposed at the rear of the movable male connector or the female connector. With the above described configuration, the male connector and the female connector are coupled, with the elastic member being urged when the first casing and the second casing are connected. The male connector or the female connector having the elastic member at the rear thereof may thus be normally urged along the connection axis (a direction toward the other connector). Accordingly, even when vibration occurs, the connection state between the male connector and the female connector is not loosened, and the connection state may normally be maintained.

According to one or more embodiments, a connector device for an electric machine tool is provided, wherein either one of a male connector or a female connector is mounted to a first casing and the other one is mounted to a second casing, and then the male connector and the female connector are coupled by connecting the first casing and the second casing. The male connector or the female connector mounted to the first casing and the male connector or the female connector mounted to the second casing are both movable along the connection axis in each of the casing to which it is mounted, and an elastic member is disposed at each of the rear of the movable male connector and the female connector so that the male connector and the female connector are coupled, with the elastic member being urged when the first casing and the second casing are connected. The male connector and the female connector are thus normally urged along the connection axis (a direction toward the other connector) from the rear due to the respective elastic member. Accordingly, even when vibration occurs, the connection state between the male connector and the female connector is not loosened, and the connection state is normally maintained. Particularly in one or more embodiments, the male connector and the female connector are both urged together along the connection axis (a direction toward the other connector), and thus the connection state between the male connector and the female connector may be further enhanced.

According to one or more embodiments, a rotation prevention mechanism is provided that prevents the male connector or the female connector movable along the connection axis in the first casing and/or the female connector or the male connector movable along the connection axis in the second casing from rotating in the casing. The male connector and/or the female connector mounted movably along the connection axis thus will not rotate in the casing. It may thus be possible to avoid a twisting of an internal wiring connected to the connector in the casing, in which the male connector and/or the female connector is mounted movably along the connection axis. It may also be possible to prevent the connector in the casing from being rotated in conjunction with vibration during the operation.

According to one or more embodiments, either one of the male connector or the female connector is secured to a first casing, while the other one is slidably fitted and inserted into a second casing, and a spacer made of an elastic member is disposed in the rear of the female connector or the male connector fitted and inserted into the second casing, so that the male connector and the female connector are coupled while the spacer being urged by connecting the first casing and the second casing. The female connector or the male connector fitted and inserted into the second casing is thus normally urged due to the elastic force of the spacer along the connection axis when the first casing and the second casing are connected, which may maintain the connecting state between the male connector and the female connector even when vibration occurs.

According to one or more embodiments, a rotation prevention mechanism is provided that prevents the female connector or the male connector slidably fitted and inserted into the second casing from rotating in the second casing. There is thus no possibility that the female connector or the male connector slidably fitted and inserted into the second casing rotates in the second casing. It may thus be possible to avoid a twisting of an internal wiring connected to the female connector or the male connector in the second casing. It may also be possible to prevent the female connector or the male connector in the second casing from being rotated in conjunction with vibration during the operation.

DETAILED DESCRIPTION

Figure 1:
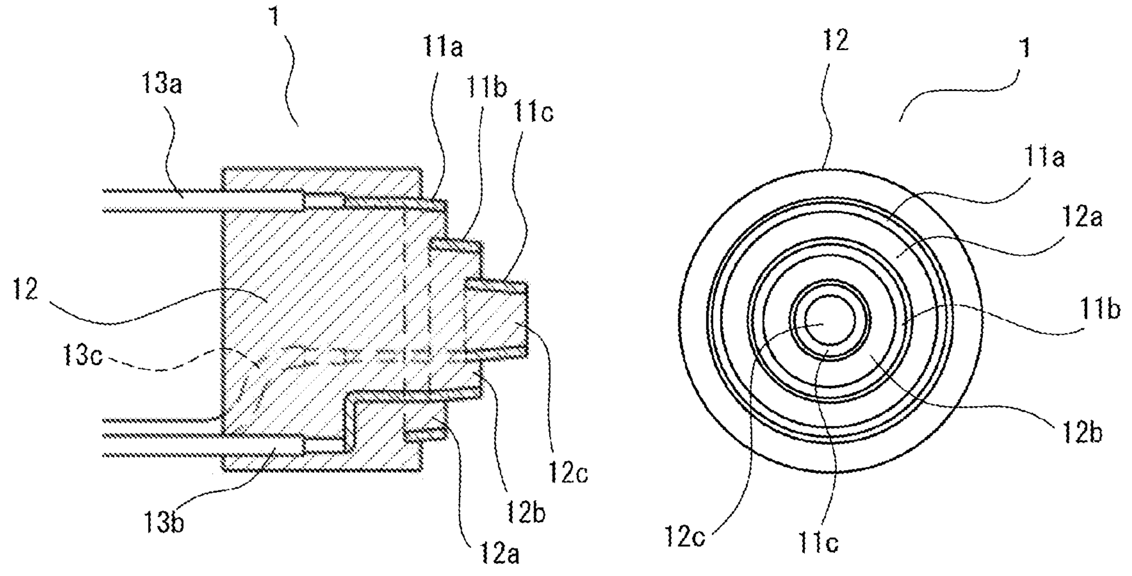
FIG. 1 is a schematic diagram illustrating a male connector of a first embodiment or embodiments.
Figure 2:
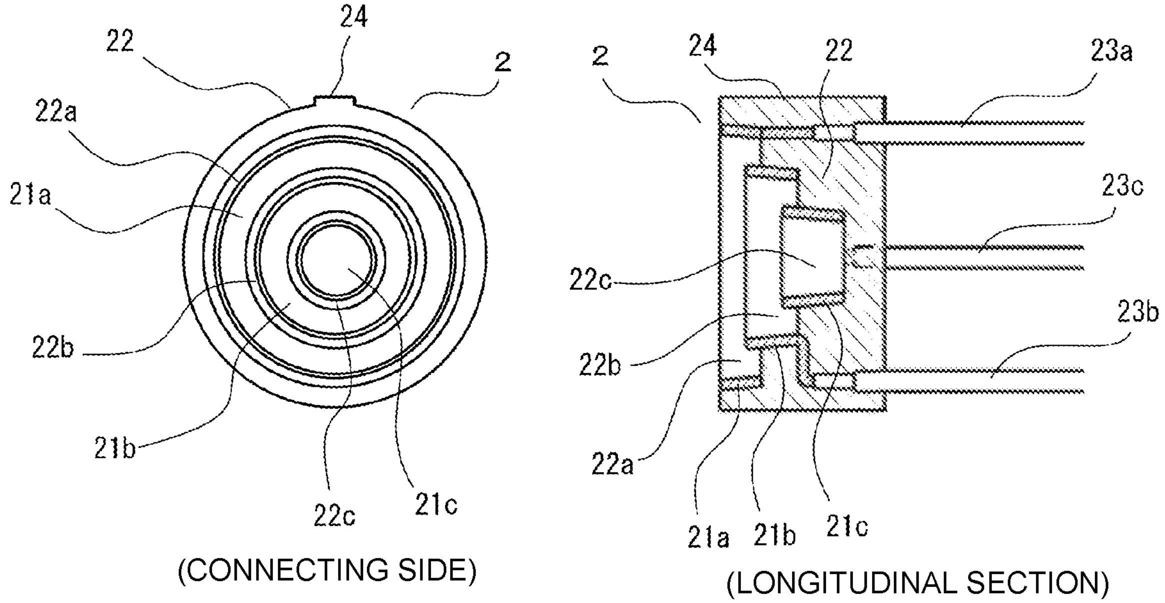
FIG. 2 is a schematic diagram illustrating a female connector of a first embodiment or embodiments.
Figure 3:
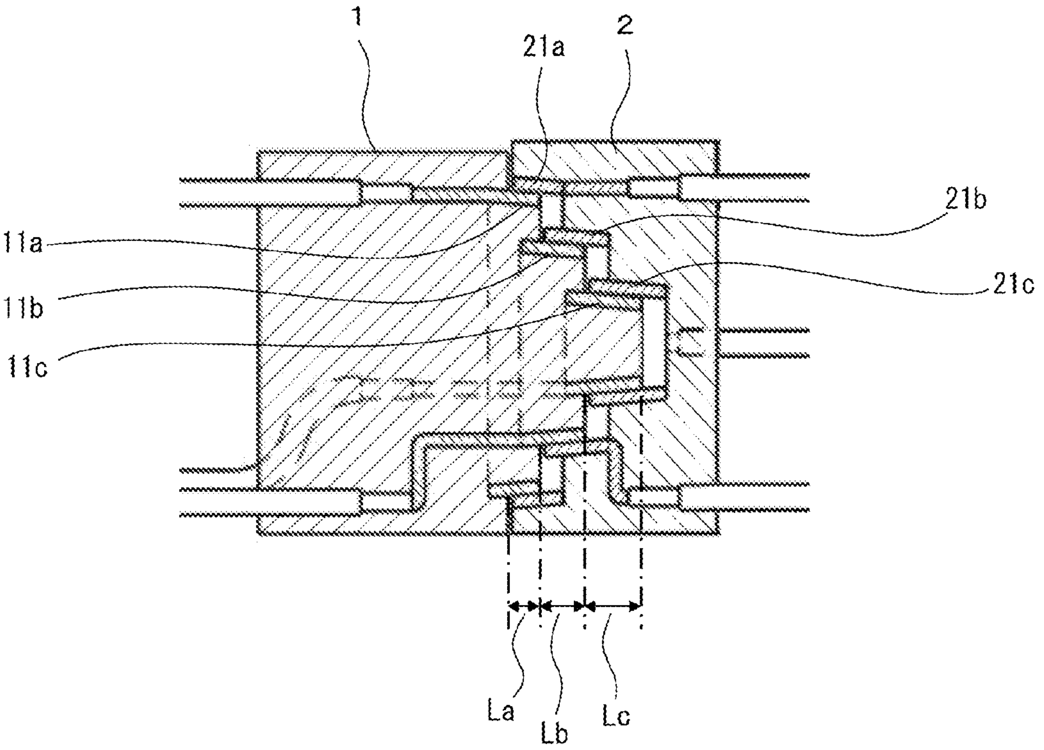
FIG. 3 is a schematic diagram illustrating a connection state of a male and female connectors of a first embodiment or embodiments.

FIGS. 1 to 3 are diagrams schematically illustrating a connector device for an electric machine tool according to a first embodiment of the present invention.

FIG. 1 is a diagram schematically illustrating a male connector 1. The male connector 1 comprises: three male contact pieces 11*a*, 11*b*, 11*c*; and a male contact piece retention portion 12 for retaining the male contact pieces 11*a*, 11*b*, 11*c*. The male contact piece retention portion 12 may be made of an insulative hard synthetic resin material, and may have a substantially cylindrical shape. Concentric convex stepped portions 12*a*, 12*b*, 12*c* centered on the central axis of the male contact piece retention portion 12 are formed on one side surface of the male contact piece retention portion 12. The concentric convex stepped portions 12*a*, 12*b*, 12*c* have different heights, which are gradually higher from outer periphery to the center. The convex stepped portions 12*a*, 12*b*, 12*c* may have a truncated cone shape slightly inclined toward the central axial direction of the male contact piece retention portion 12, with a height of each convex stepped portion (length in the axial direction) being gradually increased from the outer convex stepped portion 12*a* to the inner convex stepped portion 12*c*. (The convex stepped portion 12*b* is higher than the convex stepped portion 12*a*, and the convex stepped portion 12*c* is higher than the convex stepped portion 12*b*.) Annular portions of the respective male contact pieces 11*a*, 11*b*, 11*c*, which are made of a conductor, are externally mounted to respective outer peripheral walls of the convex stepped portions 12*a*, 12*b*, 12*c*. The male contact pieces 11*a*, 11*b*, 11*c* are arranged concentrically and shaped to conform to the shape of the respective outer peripheral wall of the convex stepped portions 12*a*, 12*b*, 12*c*, with their tips being slightly inclined toward the center of the convex stepped portions 12*a*, 12*b*, 12*c*. The height (axial length) of the annular portions of the male contact pieces 11$a$, 11$b$, 11$c$ are gradually increased from the outer male contact piece 11$a$ to the inner male contact piece 11$c$. (The male contact piece 11$b$ is higher than the male contact piece 11$a$, and the male contact piece 11$c$ is higher than the male contact piece 11$b$.) The base ends of the male contact pieces 11$a$, 11$b$, 11$c$ are inserted into and secured to a groove formed in the male contact piece retention portion 12, and then connected to respective leads 13$a$, 13$b$, 13$c$. The outer peripheral shape of the male contact piece retention portion 12 is circular in this embodiment, but it may be rectangular or various other shapes. FIG. 2 is a diagram schematically illustrating a female connector 2. The female connector 2 comprises: three female contact pieces 21$a$, 21$b$, 21$c$, and a female contact piece retention portion 22 for retaining the female contact pieces 21$a$, 21$b$, 21$c$. The female contact piece retention portion 22 is made of an insulative hard synthetic resin material, and may have a substantially cylindrical shape having the same diameter as the diameter of the male contact retention portion 12 of the male connector 1. Concentric concave stepped portions 22$a$, 22$b$, 22$c$ are formed on one side surface of the female contact piece retention portion 22, centering on the central axis of the female contact piece retention portion 22. The concave stepped portions 22$a$, 22$b$, 22$c$ have different heights, which are gradually decreasing from outer periphery toward the center. The concave stepped portions 22$a$, 22$b$, 22$c$ may have a truncated cone shape, slightly inclined toward the central axis of the female contact piece retention portion 22. Annular portions of the female contact pieces 21$a$, 21$b$, 21$c$, each made of a conductor, are externally mounted to an inner peripheral wall of the concave stepped portions 22$a$, 22$b$, 22$c$. The height (axial length) of the annular portions of the female contact pieces 21$a$, 21$b$, 21$c$ is increased gradually from the outer female contact piece 21$a$ to the inner female contact piece 21$c$. (The female contact piece 21$b$ is higher than the female contact piece 21$a$, and the female contact piece 21$c$ is higher than the female contact piece 21$b$.) The female contact pieces 21$a$, 21$b$, 21$c$ are arranged concentrically, with a base end thereof being slightly inclined toward the center of the concave stepped portions 22$a$, 22$b$, 22$c$, conforming to the shapes of the inner peripheral walls of the concave stepped portions 22$a$, 22$b$, 22$c$ (whose inclination angle is the same as the inclination angle of the male contact piece). Each of the base end of the female contact pieces 21$a$, 21$b$, 21$c$ is inserted into and secured to a groove formed in the female contact piece retention portion 22, and then connected to respective leads 23$a$, 23$b$, 23$c$. A reference numeral 24 in the drawing denotes a ridge for preventing the female connector 2 from rotating in the second casing when the female connector 2 is slidably fitted and inserted into the second casing (which is described in a third embodiment). The outer peripheral shape of the female contact piece retention portion 22 is circular in this embodiment, but it may be rectangular or various other shapes.

FIG. 3 is a diagram illustrating the male connector 1 and the female connector 2 being coupled together. The male connector 1 and the female connector 2 are configured as described above. Therefore, when the male connector 1 and the female connector 2 are coupled, respective convex stepped portions 12$a$, 12$b$, 12$c$ of the male connector 1, to which respective male contact pieces 11$a$, 11$b$, 11$c$ are mounted, and respective concave stepped portions 22$a$, 22$b$, 22$c$ of the female connector 2, to which respective female contact pieces 21$a$, 21$b$, 21$c$ are mounted, are fitted and brought into close contact with one another, as illustrated in FIG. 3. The male contact piece 11$a$ and the female contact piece 21$a$ are brought into a contact state, which is retained by the convex stepped portion 12$a$ of the male contact piece retention portion 12, and by the concave stepped portion 22$a$ of the female contact piece retention portion 22. Similarly, the male contact piece 11$b$ and the female contact piece 21$b$ are brought into a contact state, which is retained by the convex stepped portion 12$b$ and by the concave stepped portion 22$b$; and the male contact piece 11$c$ and the female contact piece 21$c$ are brought into a contact state, which is retained by the convex stepped portion 12$c$ and the concave stepped portion 22$c$. Gaps that might allow motion of the male and female contact pieces in a circumferential direction may not readily form in the connection portion, thus allowing for robust vibration resistance in the circumferential direction of the connection portion.

Connection portions between the male and female contact pieces are positioned offset axially. Specifically, a position of the connection portion between the convex stepped portion 12$a$, to which the male contact piece 11$a$ is mounted, and the concave stepped portion 22$a$, to which the female contact piece 21$a$ is mounted; a position of the connection portion between the convex stepped portion 12$b$, to which the male contact piece 11$b$ is mounted, and the concave stepped portion 22$b$, to which the female contact piece 21$b$ is mounted; as well as a position of the connection portion between the convex stepped portion 12$c$, to which the male contact piece 11$c$ is mounted, and the concave stepped portion 22$c$, to which the female contact piece 21$c$ is mounted, are displaced with respect to one another along the connection axis. This means that the contact portions between male and female contact pieces, which are potentially weak portions of the entire device, are distributed along the connection axis. This configuration can facilitate increased overall strength of the connection portions of the male connector 1 and the female connector 2, further enhancing vibration resistance.

The male contact pieces 11$a$, 11$b$, 11$c$ are arranged concentrically, with a tip end thereof being slightly inclined toward the center of the convex stepped portions 12$a$, 12$b$, 12$c$. The female contact pieces 21$a$, 21$b$, 21$c$ are arranged concentrically, with a base end thereof being slightly inclined toward the center of the concave stepped portions 22$a$, 22$b$, 22$c$ (whose inclination angle is the same as the inclination angle of the male contact piece). Therefore, urging the male connector 1 and the female connector 2 together along the connection axis can surely bring the respective male contact pieces 11$a$, 11$b$, 11$c$ and the female contact pieces 21$a$, 21$b$, 21$c$ into a surface contact with one another. Coupling and decoupling the male connector 1 and the female connector 2 may be performed by inserting one into the other, and by pulling them linearly in the connection direction. But it may be also possible to smoothly couple and decouple them by rotating one or both of the connectors.

The height (axial length) of the annular portions of the male contact pieces 11$a$, 11$b$, 11$c$ is gradually increased (higher) from the outer male contact piece 11$a$, which is the lowest, to the inner male contact piece 11$c$, which is the highest. Similarly, the height (axial length) of the annular portion of the female contact pieces 21$a$, 21$b$, 21$c$ is gradually increased from the outer female contact piece 21$a$ to the inner female contact piece 21$c$. The length of contact between each male contact piece and each female contact pieces along the connection axis may thus be set as follows: a contact length Lb of an inner contact between the male contact piece 11$b$ and the female contact piece 21$b$ is longer than a contact length La of the outermost contact between the male contact piece 11$a$ and the female contact piece 21$a$;

and a contact length Lc of a further inner contact between the male contact piece 11*c* and the female contact piece 21*c* is longer than the contact length Lb of the contact between the male contact piece 11*b* and the female contact piece 21*b*. When concentrically arranged plurality of male and female contact pieces are to be coupled together, if the contact lengths between the male and female contact pieces along the connection axis are the same, a contact surface area between the male and female contact pieces that are disposed in an inner portion becomes smaller than a contact area between the male and female contact pieces that are disposed in an outer portion, resulting in a difference in contact resistance. In contrast, by setting the contact length along the connection axis of the contact between the male and female contact pieces that are disposed in the inner portion is made longer than the contact length of the contact between the male and female contact pieces that are disposed in the outer portion as described above, the difference in contact area between the male and female contact pieces that are disposed in the inner portion and the male and female contact pieces that are disposed in the outer portion can be reduced, and thus the difference in contact resistance can be reduced.

Figure 4:
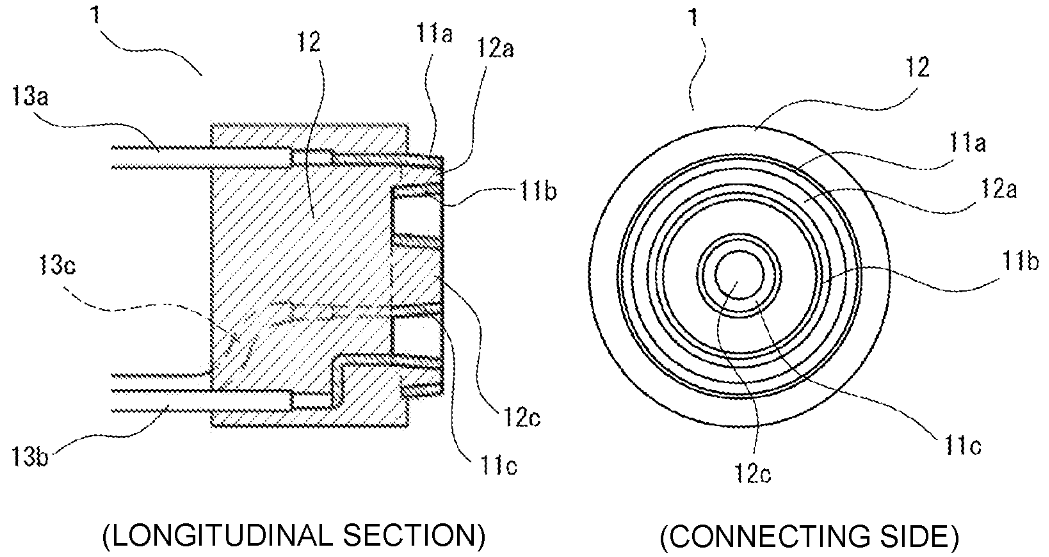
FIG. 4 is a schematic diagram illustrating a male connector of a second embodiment or embodiments.
Figure 5:
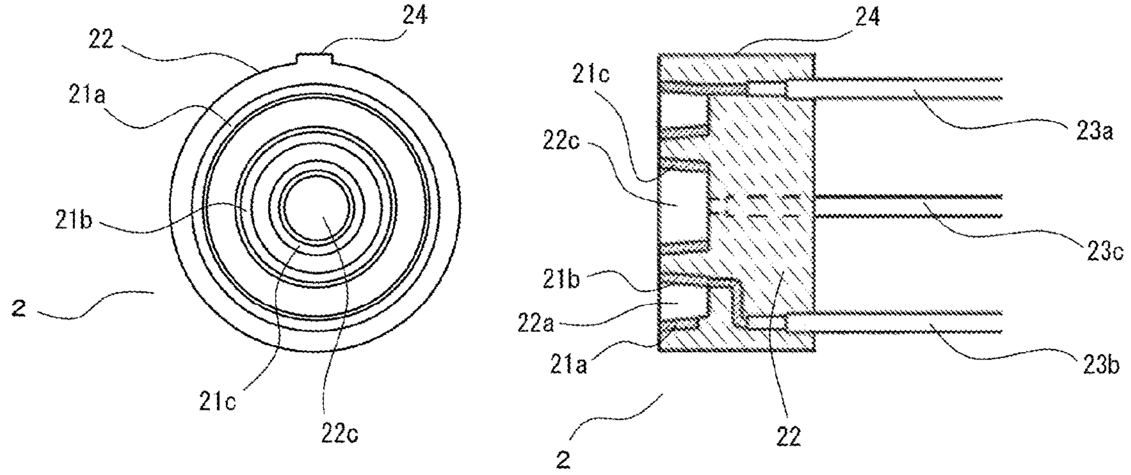
FIG. 5 is a schematic diagram illustrating a female connector of a second embodiment or embodiments.
Figure 6:
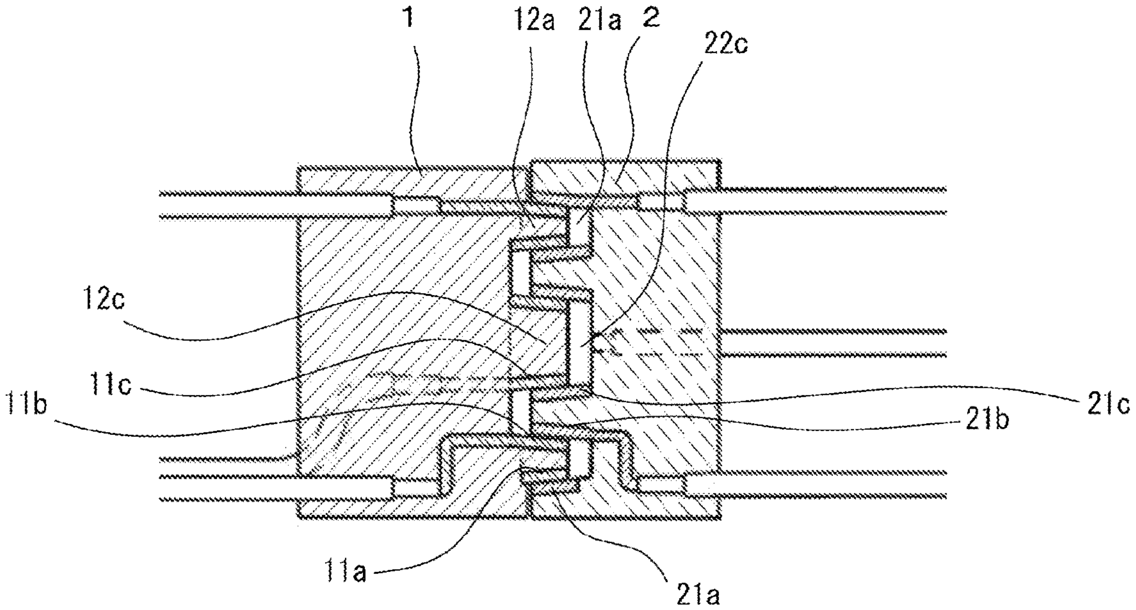
FIG. 6 is a schematic diagram illustrating a connection state of a male and female connectors of a second embodiment or embodiments.
Figure 7:
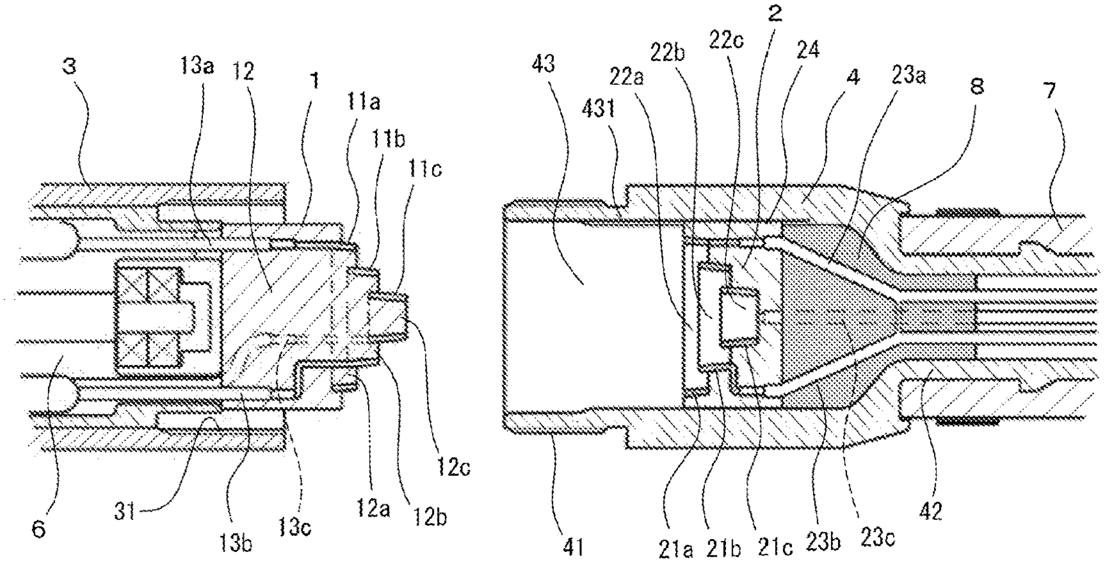
FIG. 7 is a schematic diagram illustrating a third embodiment or embodiments.

FIGS. 4 to 6 are diagrams schematically illustrating a connector device for an electric machine tool according to a second embodiment of the present invention.

FIG. 4 is a diagram schematically illustrating a male connector 1 in the second embodiment. Similarly to the male connector 1 according to the first embodiment, the male connector 1 according to the second embodiment comprises: three male contact pieces 11*a*, 11*b*, 11*c*; and a male contact piece retention portion 12 for retaining the male contact pieces 11*a*, 11*b*, 11*c*. The male contact piece retention portion 12 is made of an insulative hard synthetic resin material and may have a substantially cylindrical shape. An annular convex stepped portion 12*a* and a cylindrical convex stepped portion 12*c* are formed in the male connector 1 according to the second embodiment, on one side surface of the male contact piece retention portion 12, and concentrically about the central axis of the male contact piece retention portion 12. The convex stepped portions 12*a*, 12*c* each have a substantially trapezoidal shape in cross section, with respective peripheral wall surfaces of the convex stepped portion 12*a*, 12*c* being slightly inclined toward the center of each convex stepped portion. An annular portion of the male contact piece 11*a* is externally mounted to an outer peripheral wall located outside the convex stepped portion 12*a*; and an annular portion of the male contact piece 11*b* is externally mounted to an outer peripheral wall inside the convex stepped portion 12*a*; and an annular portion of the male contact piece 11*c* is externally mounted to an outer peripheral wall of the convex stepped portion 12*c*. (Each of the male contact pieces 11*a*, 11*b*, 11*c* are made of a conductor.) The male contact pieces 11*a*, 11*b*, 11*c* are arranged concentrically, with a tip end thereof being slightly inclined toward the center of the convex stepped portions 12*a*, 12*c*, conforming to the shape of the outer peripheral wall of the convex stepped portions 12*a*, 12*c*. A base end of the respective male contact pieces 11*a*, 11*b*, 11*c* is inserted into and secured to a groove formed in the male contact piece retention portion 12, and then connected to respective leads 13*a*, 13*b*, 13*c*. The outer peripheral shape of the male contact piece retention portion 12 is circular in this embodiment, but it may be rectangular or various other shapes, similarly to the first embodiment.

FIG. 5 is a diagram schematically illustrating a female connector 2 in the second embodiment. Similarly to the female connector 2 according to the first embodiment, the female connector 2 according to the second embodiment comprises: three female contact pieces 21*a*, 21*b*, 21*c*; and a female contact piece retention portion 22 for retaining the female contact pieces 21*a*, 21*b*, 21*c*. The female contact piece retention portion 22 is made of an insulative hard synthetic resin material and may have a substantially cylindrical shape having the same diameter as the diameter of the male contact retention portion 12 of the male connector 1. An annular concave stepped portion 22*a* and a cylindrical concave stepped portion 12*c* are arranged in the female connector 2 according to the second embodiment, on one side surface of the female contact piece retention portion 22, and concentrically about the central axis of the female contact piece retention portion 22. The concave stepped portions 22*a*, 22*c* may have a substantially trapezoidal shape in cross section, with respective peripheral wall surfaces of the concave stepped portions 22*a*, 22*c* being slightly inclined toward the center of each concave stepped portion. An annular portion of the female contact piece 21*a* is externally mounted to an inner peripheral wall outside the concave stepped portion 22*a*; an annular portion of the female contact piece 21*b* is externally mounted to an inner peripheral wall inside the concave stepped portion 22*a*; and an annular portion of the female contact piece 21*c* is externally mounted to an inner peripheral wall of the concave stepped portion 22*c*. (Each of the female contact pieces 21*a*, 21*b*, 21*c* is made of a conductor.) The female contact pieces 21*a*, 21*b*, 21*c* are arranged concentrically, with a base end thereof being slightly inclined toward the center of the respective concave stepped portions 22*a*, 22*c* (whose inclination angle is the same as the inclination angle of the male contact piece), conforming to the shape of the inner peripheral wall of the concave stepped portions 22*a*, 22*c*. A base end of the respective female contact pieces 21*a*, 21*b*, 21*c* is inserted into and secured to a groove formed in the female contact piece retention portion 22, and then connected to respective leads 23*a*, 23*b*, 23*c*. A reference numeral 24 in the drawing denotes a ridge for preventing the female connector 2 from rotating in the second casing when the female connector 2 is slidably fitted and inserted into the second casing. The outer peripheral shape of the female contact piece retention portion 22 is circular in this embodiment, but it may be rectangular or various other shapes, similarly to the first embodiment.

FIG. 6 is a diagram illustrating a configuration in which the male connector 1 and the female connector 2 according to the second embodiment are coupled. Since the male connector 1 and the female connector 2 according to the second embodiment are configured as described above, when the male connector 1 and the female connector 2 are coupled, the respective convex stepped portions 12*a*, 12*c* of the male connector 1, to which the male contact pieces 11*a*, 11*b*, 11*c* are mounted, and the concave stepped portions 22*a*, 22*c* of the female connector 2, to which the female contact pieces 21*a*, 21*b*, 21*c* are mounted, are fitted in close contact with one another, as illustrated in FIG. 6. A contact state between the male contact piece 11*a* and the female contact piece 21*a* and the male contact piece 11*b* and the female contact piece 21*b* is retained by the convex stepped portion 12*a* of the male contact piece retention portion 12, and by the concave stepped portion 22*a* of the female contact piece retention portion 22; and a contact state between the male contact piece 11*c* and the female contact piece 21*c* is retained by the convex stepped portion 12*c* and by the concave stepped portion 22*c*. Gaps that might allow motion of the male and female contact pieces in the circumferential direction may not form in the connection portion, thus allowing for robust vibration resistance in the circumferential direction in the connection portion.

The male contact pieces 11*a*, 11*b*, 11*c* are arranged concentrically, with a tip end thereof being slightly inclined toward the center of the convex stepped portions 12*a*, 12*c*. The female contact pieces 21*a*, 21*c* are arranged concentrically, with a base end thereof being slightly inclined toward the center of the concave stepped portions 22*a*, 22*c* (whose inclination angle is the same as the inclination angle of the male contact piece). The male contact pieces 11*a*, 11*b*, 11*c* and the female contact pieces 21*a*, 21*b*, 21*c* can thus be surely brought into surface contact with one another, by urging the male connector 1 and the female connector 2 together along the connection axis. Coupling and decoupling the male connector 1 and the female connector 2 may be performed by linearly inserting one into the other, and linearly pulling them in the connection direction. However, it is also possible to smoothly couple and decouple them by rotating one or both connectors.

FIGS. 7 to 12 are diagrams schematically illustrating a connector device for an electric machine tool according to a third embodiment of the present invention. In the third embodiment, a casing is mounted to each of the male connector 1 and the female connector 2 according to the first embodiment.

In the description of the third embodiment, a vibrator casing 3 of a concrete vibrator is used as an example of a first casing, to which the male connector 1 or the female connector 2 is mounted. A hose joint 4 is used as an example of a second casing, to which the female connector 2 is mounted when the male connector 1 is mounted to the first casing. Note that, the male connector 1 is mounted to the second casing when the female connector 2 is mounted to the first casing.

The vibrator casing 3 as the first casing is configured using a cylindrical member made of steel. An eccentric weight 5 and a motor 6 are mounted in the vibrator casing 3. The eccentric weight 5 serves as a vibration generator of the concrete vibrator. The motor 6 is used to rotate the eccentric weight 5. The male connector 1 is secured to the base end of the vibrator casing 3. Respective leads 13*a*, 13*b*, 13*c* connected to the male contact pieces 11*a*, 11*b*, 11*c* are connected to a stator of the motor 6. An internal thread 31 is formed on an inner surface at the base end of the vibrator casing 3, to which the male connector 1 has been secured, for a screw connection to a connection portion of the hose joint 4.

The hose joint 4 as the second casing is configured using a cylindrical member made of steel, having the same diameter as that of the vibrator casing 3. An external thread 41 is formed on one end of the hose joint 4 to provide a screw connection to the base end of the vibrator casing 3. A hose connection portion 42 is provided on the other end of the hose joint 4. The hose connection portion 42 is connected and fitted into an inner cavity of a hose 7. The hose joint 4 has an inner cavity 43 having a diameter that accommodates the female connector 2 slidably fitted and inserted into the inner cavity 43. The inner cavity 43 has a diameter gradually reduced in a portion nearer the hose connection portion 42. The inner cavity 43 has a groove 431 along the axis. The groove 431 can be fitted into a ridge 24 formed on an outer peripheral surface of the female connector 2. The female connector 2 may be fitted and inserted into the inner cavity 43 of the hose joint 4 through a rubber spacer 8, and slidable in the axial direction. The spacer 8 may have a shape that can be fitted with a portion of the inner cavity 43 nearer to the hose connection portion. Respective leads 23*a*, 23*b*, 23*c* connected to the female contact pieces 21*a*, 21*b*, 21*c* are drawn to the hose 7 through inside the spacer 8. The female connector 2 is mounted to the hose joint 4 such that it is slidable only in the axial direction of the hose joint 4, in which the ridge 24 formed on the outer peripheral surface of the female connector 2 is fitted with the groove 431 formed in the inner cavity 43 of the hose joint 4, and fitted and inserted into the inner cavity 43. Therefore, there is no risk that the female connector 2 rotates in the inner cavity 43 of the hose joint 4. As described above, in this embodiment, the rotation prevention mechanism is configured by the ridge 24 formed on the outer peripheral surface of the female connector 2, and by the groove 431 formed in the inner cavity 43 of the hose joint 4. Alternatively, the rotation prevention mechanism may have a configuration (not shown), in which the female contact piece retention portion 22 of the female connector 2 has a substantially prism-like shape having a substantially rectangular outer peripheral shape in cross section, and the inner cavity 43 of the hose joint 4 has a shape into which the female contact piece retention portion 22 having the substantially rectangular shape in cross section can be slidably fitted. The ridges 24 and the groove 431 are not required in this example.

Figure 8:
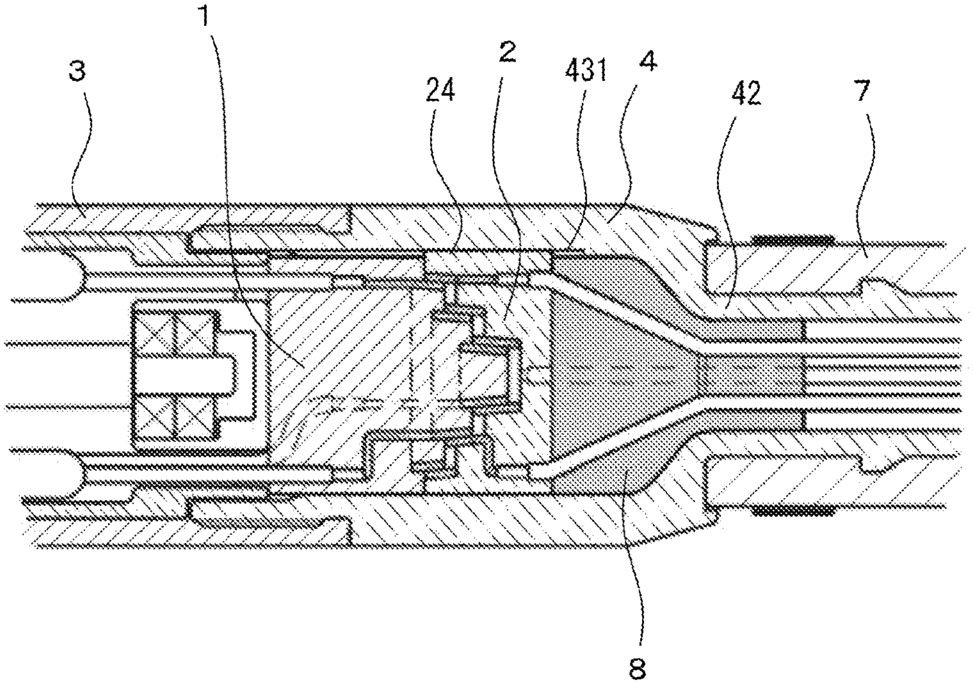
FIG. 8 is a schematic diagram illustrating a connection state of a third embodiment or embodiments.
Figure 9:
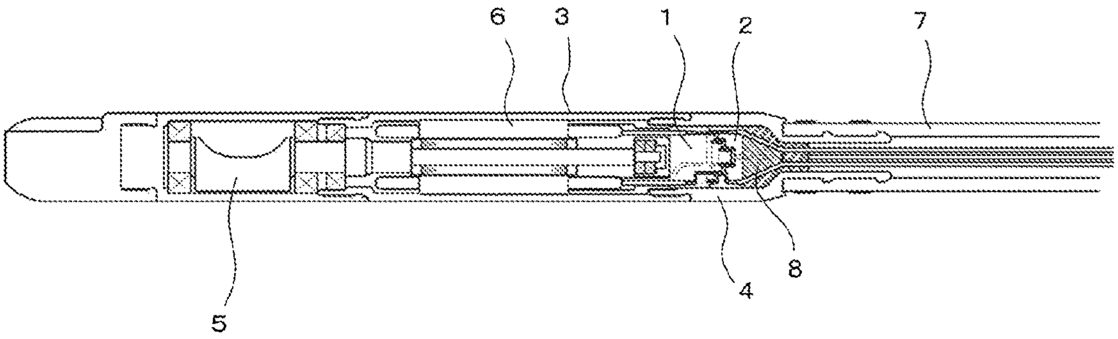
FIG. 9 is a schematic diagram illustrating a concrete vibrator of a third embodiment or embodiments.

FIGS. 8 and 9 are diagrams illustrating a connection state of a concrete vibrator comprising a connector apparatus for an electric machine tool according to the third embodiment. In the third embodiment, the male connector 1 and the female connector 2 are coupled by screwing the vibrator casing 3, to which the male connector 1 has been secured, to the hose joint 4, to which the female connector 2 has been mounted such that the vibrator casing 3 is slidable in an axial direction in the inner cavity 43. In the inner cavity 43 of the hose joint 4, the rubber spacer 8 is disposed in the rear of the female connector 2.

Therefore, when the vibrator casing 3 and the hose joint 4 are screwed together, the male connector 1 secured to the vibrator casing 3 urges the female connector 2 in the axial direction. The female connector 2 urged by the male connector 1 slides rearward and then urges the spacer 8. The spacer 8 urged by the female connector 2 is blocked by a portion of the inner cavity 43 at which the diameter is reduced, and thus the female connector 2 is pushed back toward the male connector 1 due to the elastic force of the spacer 8. The male connector 1 and the female connector 2 may thus retain a connection while being normally urged one another, further enhancing vibration resistance in the connection portion. Other advantages of the connection between the male connector 1 and the female connector 2 are similar to those obtained with the connector device of the first embodiment.

Figure 10:
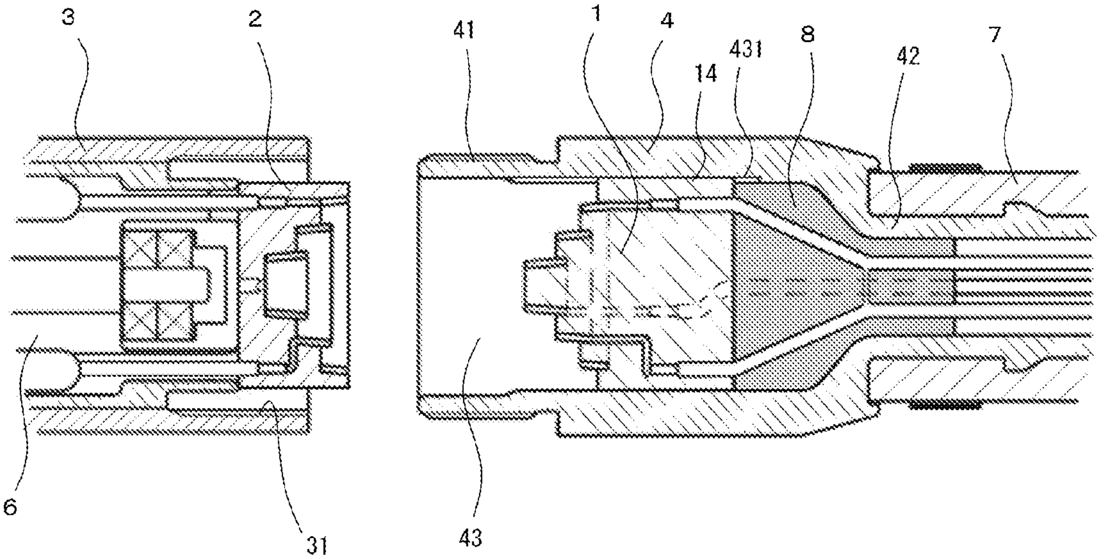
FIG. 10 is a schematic diagram illustrating a modification example of a third embodiment or embodiments.
Figure 11:
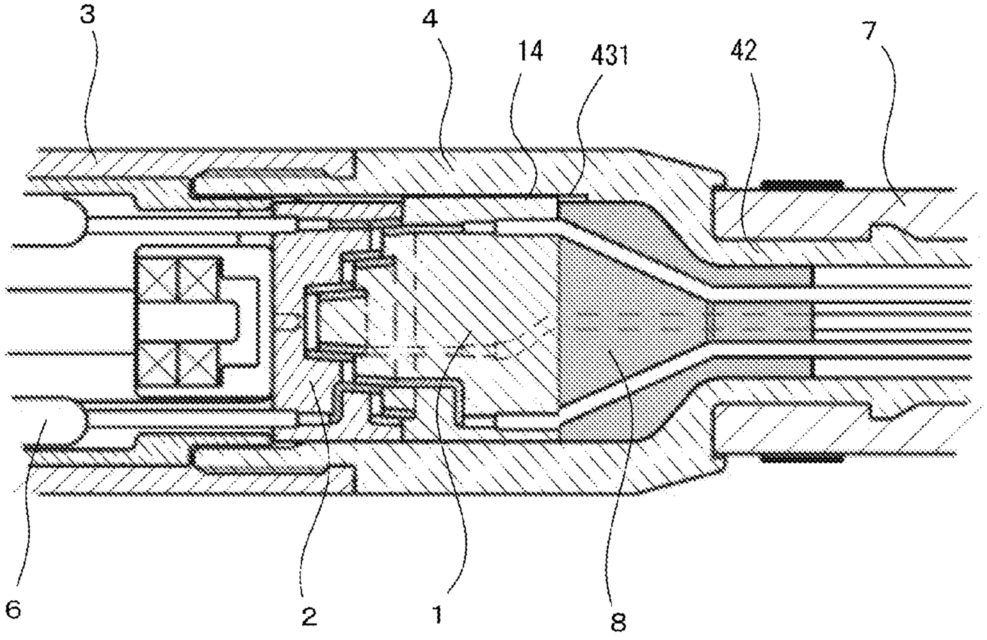
FIG. 11 is a schematic diagram illustrating a connection state according to a modification example of a third embodiment or embodiments.

FIGS. 10 and 11 are diagrams schematically illustrating modification examples of the third embodiment, wherein casings, to which the male connector 1 and the female connector 2 are respectively mounted, are switched. In other words, the female connector 2 is secured to the vibrator casing 3, which is the first casing; meanwhile the male connector 1 is slidably fitted and inserted into the inner cavity 43 of the hose joint 4, which is the second casing, in an axial direction through the rubber spacer 8. In this modification example, a ridge 24 is not formed on the outer peripheral surface of the female connector 2 which is to be secured to the vibrator casing 3. Instead, a ridge 14 is formed on an outer peripheral surface of the male connector 1 which is fitted and inserted into the hose joint 4. Other configurations are similar to those of the third embodiment described above. This modification example can also provide similar advantages to those obtained according to the third embodiment.

Figure 12:
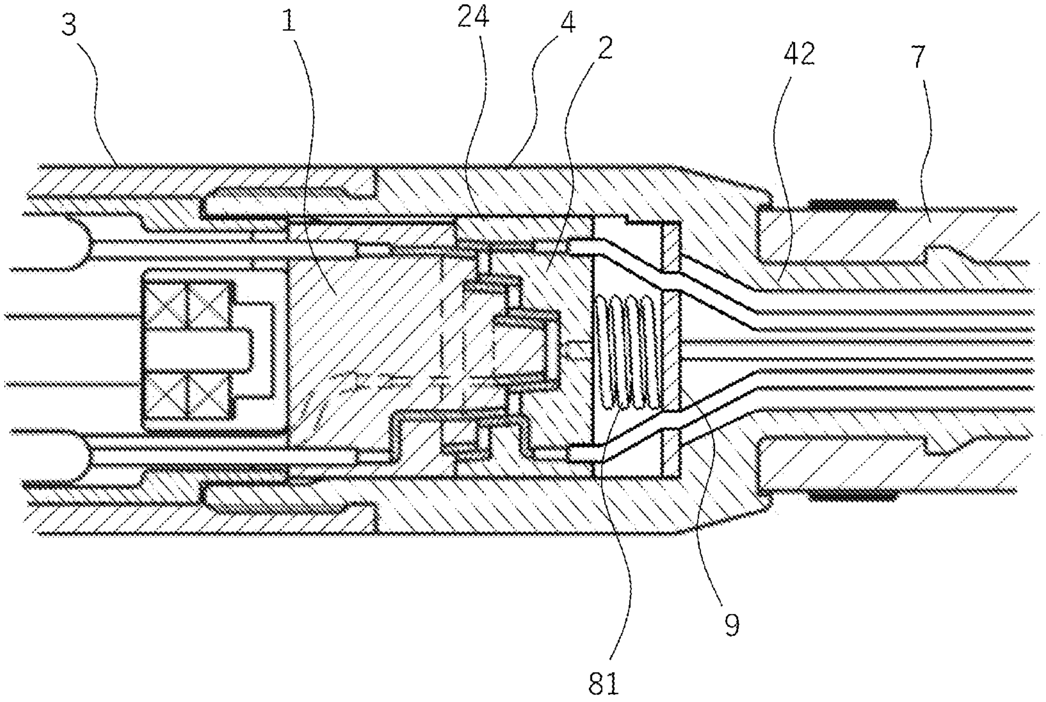
FIG. 12 is a schematic diagram illustrating a connection state according to another modification example of a third embodiment or embodiments.

FIG. 12 is a diagram illustrating another modification example of the third embodiment. In this modification example, instead of the rubber spacer 8, a steel spring (compression coil spring) 81 is used as an "elastic member disposed in the rear of a male connector or a female connector that is movable along the connection axis in the casing." In this modification example, the female connector 2 is fitted and inserted into the inner cavity 43 of the hose joint 4, which is the second casing, and slidable in an axial direction through the steel spring 81 supported by a support plate 9. Other configurations are similar to those of the third embodiment.

In this modification example, the steel spring 81 is disposed in the rear of the female connector 2 in the inner cavity 43 of the hose joint 4. Therefore, when the vibrator casing 3 and the hose joint 4 are screwed together, the male connector 1 secured to the vibrator casing 3 urges the female connector 2 in the axial direction. The female connector 2 urged by the male connector 1 then slides rearward and urges the spring 81. Since the spring 81 urged by the female connector 2 is supported by the support plate 9, the female connector 2 is pushed back toward the male connector 1 due to the elastic force of the spring 81. In this way, the male connector 1 and the female connector 2 are coupled, while being normally urged together. Vibration resistance in the connection portion can thus be improved similarly to the third embodiment. Since the steel spring 81 is superior to the rubber spacer 8 in terms of durability, the durability can be improved when the steel spring 81 is used as the "elastic member disposed in the rear of a male connector or a female connector that is movable along the connection axis inside the casing", as compared with a case where the rubber spacer 8 is used. Other advantages are similar to those of the third embodiment.

Figure 13:
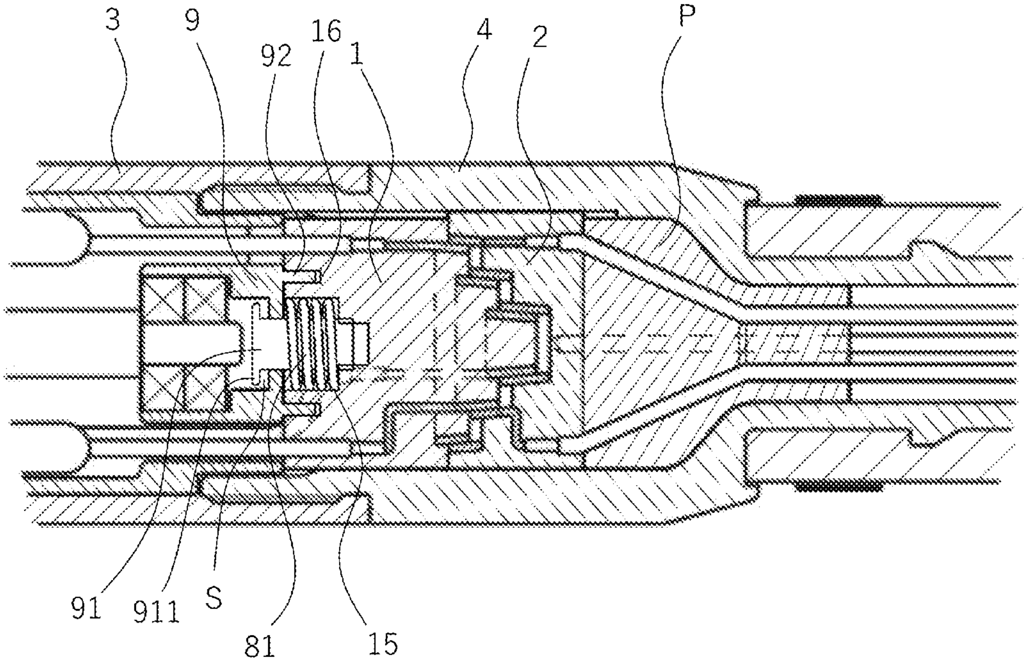
FIG. 13 is a diagram illustrating a connection state of a fourth embodiment or embodiments.

FIG. 13 is a diagram schematically illustrating a fourth embodiment. The third embodiment is an example in which the male connector 1 is secured to the vibrator casing 3 (first casing), and the elastic member (a rubber spacer 8 or spring 81) is disposed in the rear of the female connector 2, which is mounted movably along the connection axis inside the hose joint 4 (second casing). In contrast, in the fourth embodiment, the female connector 2 is secured to the hose joint 4 (second casing), which is mounted movably along the connection axis inside the vibrator casing 3 (first casing), and an elastic member (a spring or rubber spacer) is disposed in the rear of the male connector 1.

In the fourth embodiment, a cylindrical concave portion 15 is formed on a surface in the rear of the male connector 1, which is mounted to the vibrator casing 3 (a side opposite to the side to be connected to the female connector 2). A steel spring (compression coil spring) 81 is fitted and inserted into the concave portion 15. A securing shaft 91 is inserted into a hole in a supporting member 9 of the vibrator casing 3 and into an inner cavity of the spring 81 fitted and inserted into the concave portion 15 of the male connector 1. A tip of the securing shaft 9 is screwed into the male connector 1, thereby the male connector 1 is mounted to the vibrator casing 3. As illustrated in FIG. 13, the securing shaft 91 has a length such that a certain degree of a gap S may be left between a flange 911 of the securing shaft 91 and the supporting member 9 in a state where the male connector 1 is urged to a degree such that the male connector 1 abuts against the supporting member 9. The male connector 1 is thus movable in the axial direction by a length of a gap S. When the flange 911 of the securing shaft 91 does not abut against the supporting member 9 (in a state where the gap S exists), the male connector 1 is kept urged in the direction of the connection with the female connector 2 from the rear due to the elastic force of the spring 81. In the fourth embodiment, the spring 81 is used as the elastic member that urges the male connector 1 along the connection axis from the rear, however, a cylindrical rubber spacer may be used instead.

A protrusion 92 is formed on a front surface (a surface to which the male connector 1 is mounted) of the supporting member 9. A protrusion insertion hole 16, into which the protrusion 92 can be inserted, is formed on a rear surface of the male connector 1. When the male connector 1 is mounted to the supporting member 9 with the protrusion 92 being inserted into the protrusion insertion hole 16, the male connector 1 will not rotate in the circumferential direction. The length of the protrusion 92 is determined to be longer than the length of the gap S. With this configuration, the protrusion 92 will not be disengaged from the protrusion insertion hole 16 even when the male connector 1 is moved to the maximum in the direction of connection with the female connector 2 due to the elastic force of the spring 81 (when the flange 911 of the securing shaft 91 abuts against the supporting member 9). This can surely avoid the rotation of the male flange 1 in the circumferential direction. In this embodiment, the protrusion 92 is provided on the supporting member 9, and the protrusion insertion hole 16 is provided on the male connector 1. However, the protrusion 92 may be provided on the male connector 1 and the protrusion insertion hole 16 may be provided on the supporting member 9, instead.

The female connector 2 is secured in the inner cavity 43 of the hose joint 4 (second casing). The female connector 2 thus will not move in a connection axis direction, and will not rotate in the circumferential direction as well. A reference symbol P in the drawing refers to a spacer made of resin.

In the fourth embodiment, the elastic member (spring or rubber spacer) is disposed in the rear of the male connector 1 in the vibrator casing 3 (first casing). Therefore, when the vibrator casing 3 and the hose joint 4 are screwed together, the female connector 2 secured to the hose joint 4 urges the male connector 1 in the axial direction. The male connector 1 urged by the female connector 2 then moves rearward and urges the elastic member (spring or rubber spacer). The male connector 1, however, is pushed back due to the elastic force of the elastic member (spring or rubber spacer). As a result, the male connector 1 and the female connector 2 are coupled while being urged together, and thus similar advantages to those of the third embodiment can be obtained.

Figure 14:
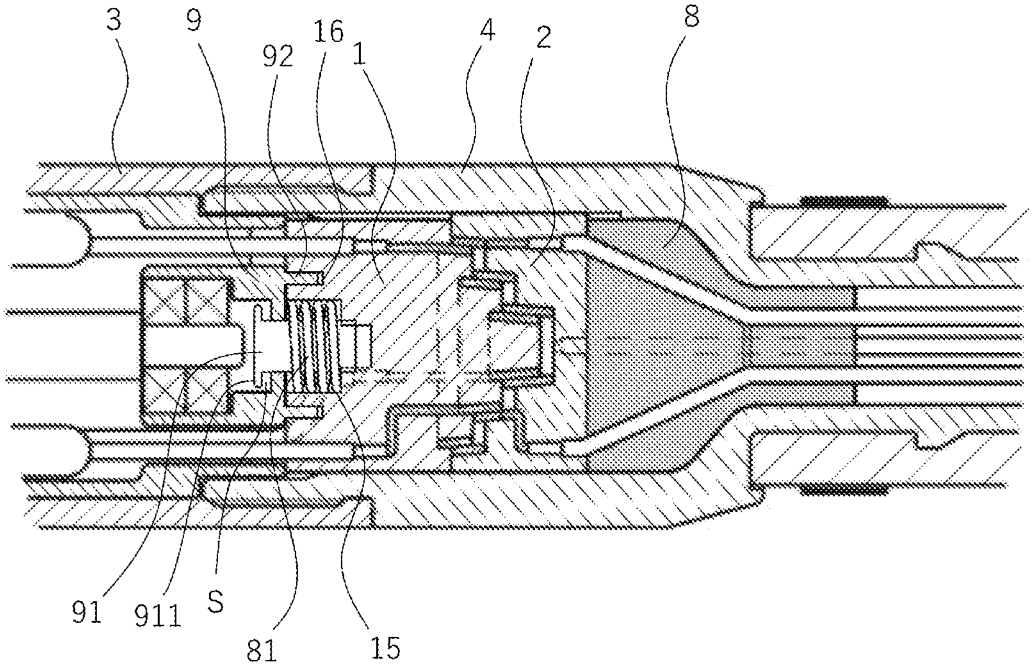
FIG. 14 is a diagram illustrating a connection state of a fifth embodiment or embodiments.

FIG. 14 is a diagram schematically illustrating a fifth embodiment, wherein the configuration of the hose joint 4 (second casing), to which the female connector 2 is mounted, in the third embodiment is combined with the configuration of the vibrator casing 3 (first casing), to which the male connector 1 is mounted, in the fourth embodiment. Since the configuration of the hose joint 4 (second casing), to which the female connector 2 is mounted, was described in the third embodiment, and the configuration of the vibrator casing 3 (first casing), to which the male connector 1 is mounted, was described in the fourth embodiment, the description of these configurations is omitted.

In the fifth embodiment, the spring 81 is illustrated as an elastic member that urges the male connector 1 along the connection axis from the rear, and the rubber spacer 8 is illustrated as an elastic member that urges the female connector 2 along the connection axis from the rear. Alternatively, a cylindrical rubber spacer may be used as an elastic member disposed in the rear of the male connector 1, or a spring may be used as an elastic member disposed in the rear of the female connector 2, instead.

In the fifth embodiment, the male connector 1 mounted to the vibrator casing 3 (first casing) and the female connector 2 mounted to the hose joint 4 (second casing) are urged together along the connection axis (the direction to the other connector) by respective elastic members (spring 81, spacer 8) disposed at the rear thereof. This configuration allows for more robust connection state between the male connector 1 and the female connector 2.

In the description of the third to fifth embodiments, the male connector 1 and the female connector 2 according to the first embodiment are used. It goes without saying that the male connector 1 and the female connector 2 according to the second embodiment may also be used, in place of the male connector 1 and the female connector 2 according to the first embodiment. When the male connector 1 and the female connector 2 according to the second embodiment are used in the third to fifth embodiments, the advantage of the vibration resistance in the connection portion that can be further improved by the effects of the spacer 8 or the spring 81 will be similar to the advantage of the third to fifth embodiments. However, other advantages of the connection portion between the male connector 1 and the female connector 2 will be similar to those obtained with the connector device according to the second embodiment.

Figure 15:
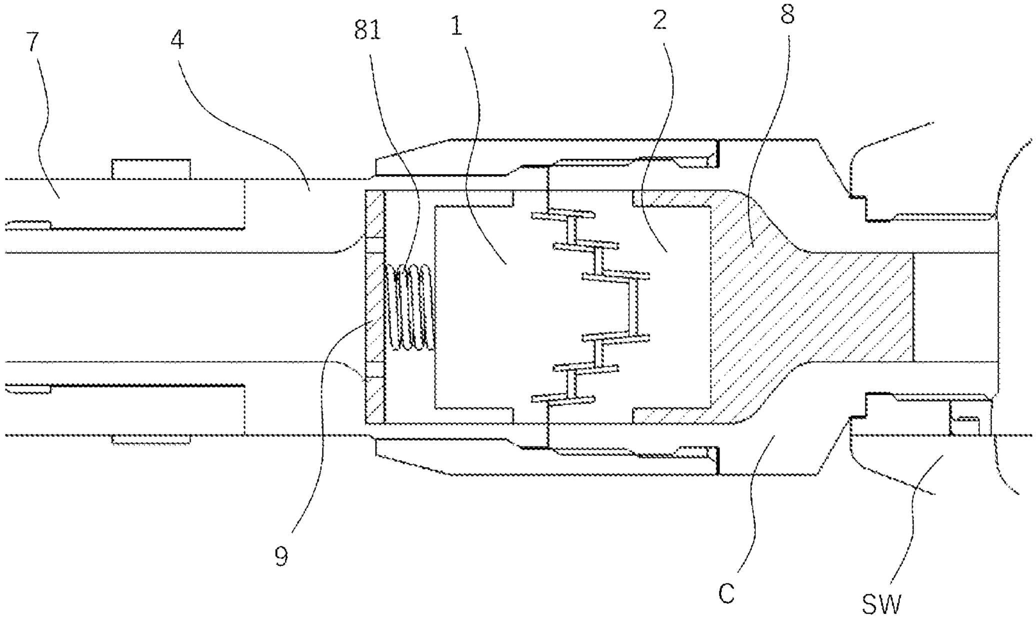
FIG. 15 is a diagram illustrating an example of another first casing and second casing.

In the description of the third to fifth embodiments, the vibrator casing 3 of the concrete vibrator is used as an example of the first casing, and the hose joint 4 is used as an example of the second casing. The first casing and the second casing, however, are not limited to these examples. Various types of casings, which can be used as a casing for a connector device used for an internal wiring connection of an electric machine tool, can be used for the first casing and the second casing. For instance, FIG. 15 illustrates an example in which the hose coupling 4 of the concrete vibrator is used for the first casing, and a joint C of a switch case SW is used for the second casing (leads or the like are omitted in the drawing).

INDUSTRIAL APPLICABILITY

The disclosed art relates to a connector device for use in an internal wiring connection of various electric machine tools that cause vibration, and has industrial applicability.

DESCRIPTION OF REFERENCE NUMERALS

1: Male connector
11*a*, 11*b*, 11*c*, (11*n*): Male contact piece
12: Male contact piece retention portion
12*a*, 12*b*, 12*c*, (12*n*): Convex stepped portion
13*a*, 13*b*, 13*c*, (13*n*): Leads
14: Ridge
15: Concave portion
16: Protrusion insertion hole
2: Female connector
21*a*, 21*b*, 21*c*, (21*n*): Female contact piece
22: Female contact piece retention portion
22*a*, 22*b*, 22*c*, (22*n*): Concave stepped portion
23*a*, 23*b*, 23*c*, (23*n*): Leads
24: Ridge
3: Vibrator casing (First casing)
31: Connection internal thread
4: Hose joint (Second casing)
41: Connection external thread
42: Hose connection
43: Inner cavity
431: Groove
5: Eccentric weight
6: Motor
7: Hose
8: Spacer
81: Spring
9: Supporting member
91: Securing shaft
911: Flange
92: Protrusion
S: Gap
P: Resin spacer
C: Switch joint

The invention claimed is:

1. A connector device for an electric machine tool, the connector device removably connecting an internal wiring of the electric machine tool, the connector device comprising:

a male connector comprising:
- a plurality of male contact pieces; and
- a male contact piece retention portion that retains the plurality of male contact pieces; and a female connector comprising:
- a plurality of female contact pieces; and
- a female contact piece retention portion that retains the plurality of female contact pieces, wherein
- the male contact piece retention portion comprises a plurality of convex portions arranged concentrically,
- the plurality of male contact pieces are mounted on an outer peripheral wall of the convex portion and arranged concentrically, with a tip end thereof being inclined toward a center of the convex portion,
- the female contact piece retention portion comprises a plurality of concave portions arranged concentrically,
- the plurality of female contact pieces are mounted on an inner peripheral wall of the concave portion and arranged concentrically, with a base end thereof being inclined toward a center of the concave portion,
- the convex portion, to which the male contact piece is mounted, and the concave portion, to which the female contact piece is mounted, are brought into contact and tightly fitted with one another,
- either one of the male connector or the female connector being mounted to a first casing, and the other one being mounted to a second casing, and a connection of the first casing and the second casing bringing the male connector and the female connector into a connection one another,
- at least one of the male connector or the female connector mounted to either one of the first casing or the second casing is movable in a direction of a connection axis in the casing to which it is mounted,
- the male connector or the female connector comprises an elastic member that is disposed in a rear of the movable male or the female connector, and
- the male connector and the female connector are brought into a connection, with the elastic member being urged when the first casing and the second casing are connected.

2. A connector device for an electric machine tool, the connector device removably connecting an internal wiring of the electric machine tool, the connector device comprising:

a male connector comprising:

a plurality of male contact pieces; and a male contact piece retention portion that retains the plurality of male contact pieces; and a female connector comprising:

a plurality of female contact pieces; and a female contact piece retention portion that retains the plurality of female contact pieces, wherein the male contact piece retention portion comprises a plurality of convex portions arranged concentrically, the plurality of male contact pieces are mounted on an outer peripheral wall of the convex portion and arranged concentrically, with a tip end thereof being inclined toward a center of the convex portion, the female contact piece retention portion comprises a plurality of concave portions arranged concentrically, the plurality of female contact pieces are mounted on an inner peripheral wall of the concave portion and arranged concentrically, with a base end thereof being inclined toward a center of the concave portion, the convex portion, to which the male contact piece is mounted, and the concave portion, to which the female contact piece is mounted, are brought into contact and tightly fitted with one another, either one of the male connector or the female connector being mounted to a first casing, and the other one being mounted to a second casing, and a connection of the first casing and the second casing bringing the male connector and the female connector into a connection one another, the male connector or the female connector mounted to the first casing and the female connector or the male connector mounted to the second casing are both movable in a direction of a connection axis in the casing to which it is mounted, each of the male connector and the female connector comprises an elastic member that is disposed each of in a rear of the movable male connector and in a rear of the movable female connector, and the male connector and the female connector are brought into a connection, with the elastic member being urged when the first casing and the second casing are connected.

3. The connector device for an electric machine tool according to claim 1, further comprising a rotation prevention mechanism that prevents at least one of the male connector and the female connector mounted movably along the connection axis from being rotated in the casing.

4. A connector device for an electric machine tool, the connector device removably connecting an internal wiring of the electric machine tool, the connector device comprising:

a male connector comprising:

a plurality of male contact pieces; and a male contact piece retention portion that retains the plurality of male contact pieces; and a female connector comprising:

a plurality of female contact pieces; and a female contact piece retention portion that retains the plurality of female contact pieces, wherein the male contact piece retention portion comprises a plurality of convex portions arranged concentrically, the plurality of male contact pieces are mounted on an outer peripheral wall of the convex portion and arranged concentrically, with a tip end thereof being inclined toward a center of the convex portion, the female contact piece retention portion comprises a plurality of concave portions arranged concentrically, the plurality of female contact pieces are mounted on an inner peripheral wall of the concave portion and arranged concentrically, with a base end thereof being inclined toward a center of the concave portion, the convex portion, to which the male contact piece is mounted, and the concave portion, to which the female contact piece is mounted, are brought into contact and tightly fitted with one another, either one of the male connector or the female connector is secured to a first casing, and the other one is slidably fitted and inserted into a second casing, the connector device further comprises a spacer comprises an elastic member that is disposed in the rear of the female connector or the male connector fitted and inserted into the second casing, and the male connector and the female connector are brought into connection, with the spacer being urged, by connecting the first casing and the second casing.

5. The connector device for an electric machine tool according to claim 4, further comprising a rotation prevention mechanism that prevents the female connector or the male connector slidably fitted and inserted into the second casing from being rotated in the second casing.

6. The connector device for an electric machine tool according to claim 2, further comprising a rotation prevention mechanism that prevents the male connector and/or the female connector mounted movably along the connection axis from being rotated in the casing.

* * * * *